United States Patent [19]
Imaseki et al.

[11] Patent Number: 5,184,298
[45] Date of Patent: Feb. 2, 1993

[54] REAR WHEEL STEERING SYSTEM FOR VEHICLE

[75] Inventors: Takashi Imaseki; Minoru Tamura; Toru Iwata; Yuichi Fukuyama, all of Kanagawa, Japan

[73] Assignee: Nissan Motor Company, Limited, Japan

[21] Appl. No.: 575,012

[22] Filed: Aug. 30, 1990

[30] Foreign Application Priority Data

Sep. 1, 1989 [JP] Japan ................. 1-227074

[51] Int. Cl.⁵ .............................. B62D 6/00
[52] U.S. Cl. ........................ 364/424.05; 180/140; 180/142; 280/91
[58] Field of Search .......... 364/424.05; 180/79.1, 180/140–143; 280/91

[56] References Cited

U.S. PATENT DOCUMENTS

| | | | |
|---|---|---|---|
| 4,715,466 | 12/1987 | Ishii et al. | 180/140 |
| 4,768,602 | 9/1988 | Inoue et al. | 364/424.05 |
| 4,949,265 | 8/1990 | Eguchi et al. | 180/140 |

FOREIGN PATENT DOCUMENTS

| | | |
|---|---|---|
| 3904920A1 | 8/1989 | Fed. Rep. of Germany . |
| 55-91458 | 7/1980 | Japan . |
| 61-12783 | 7/1987 | Japan . |
| 62-267095 | 4/1989 | Japan . |
| 62-267096 | 4/1989 | Japan . |
| 2154523A | 9/1985 | United Kingdom . |

*Primary Examiner*—Gary Chin
*Attorney, Agent, or Firm*—Lowe, Price, LeBlanc & Becker

[57] ABSTRACT

A system for controlling a steering angle for the rear wheels of a vehicle is provided. This system includes generally, a torque sensor for detect torque of driven wheel, an angle sensor for sensing a steered angle of front wheels, a steering controller for determining a rear wheel target steering angle, and an actuator for steering the rear wheels by the rear wheel target steering angle. The steering controller first determines a rear wheel steering angle based on the steered angle of the front wheels and then calculates a correction for the rear wheel steering angle according to variation in the torque of the driven wheels during running to determine the proper rear wheel target steering angle.

15 Claims, 5 Drawing Sheets

REAR WHEEL STEERING SYSTEM FOR VEHICLE

BACKGROUND OF THE INVENTION

1. Technical Field

The present invention relates generally to a steering control system for a vehicle. More particularly, the invention relates to a rear wheel steering control system for preventing tuck-in or drift-out from occurring due to sudden acceleration during turning.

2. Background Art

A Japanese Patent First Publication No. 55-91458 discloses a four-wheel steering (4WS) system for steering rear wheels in addition to front wheel steering control. This system is operable to steer rear wheels at the same phase as a steered angle of front wheels in a range of steered angle less than a preselected angle while it steers the rear wheels at a phase opposite the front wheels over that range. When a steering wheel is greatly turned for changing directions or making a U-turn for example, the rear wheels are controlled to be steered in the opposite phase to improve turning properties with respect to the possible minimum turning circle. Additionally, when the steering wheel is slightly turned for changing lanes for example during high speed travel, the rear wheels are steered at the same phase to generate cornering forces on the rear wheels positively improving steering stability.

However, such a vehicle has a drawback in that there is a tendency for the vehicle to become unstable if an acceleration pedal is operated suddenly during a steering operation of the front wheels. This means that in a case of a front-wheel drive (FWD) vehicle, releasing the acceleration pedal suddenly during turning causes tuck-in to occur which directs the vehicle to an inside direction where a turning radius becomes small or suddenly depressing the acceleration pedal causes drift-out which increases the turning radius.

A Japanese Patent Second Publication No. 64-6068 discloses a four-wheel steering system for avoiding such a drawback. This system is adapted for detecting engine load based on the amount of depression of an acceleration pedal to correct a rear wheel steering angle according to the detected engine load, thereby canceling tuck-in or drift-out. For detecting engine load, this conventional four-wheel steering system includes a throttle opening detection unit or throttle valve sensor disposed on an acceleration pedal or an engine throttle valve to correct rear wheel steering control based on the engine load. However, appropriate correction may be not obtained when a driver shifts a transmission during rear wheel steering.

Sudden operation of the acceleration pedal causes the engine load to vary, thereby causing engine torque to vary suddenly resulting in an undesired vehicle attitude change such as tuck-in or drift-out. The cause of the vehicle attitude change is not the engine torque, but the torque of the driven wheels. Driven wheel torque is defined by multiplying the engine torque by a torque ratio corresponding to a gear ratio of the transmission (for automatic transmissions, addition of a torque ratio of a torque converter is necessary). The driven wheel torque is variable in accordance with gearshift position or the gear ratio of the transmission.

Therefore, in prior art rear wheel steering systems, when the driven wheel torque is low at a high gearshift position regardless of great engine torque, over correction is made affecting the steering stability.

SUMMARY OF THE INVENTION

It is accordingly one object of the present invention to avoid the disadvantages of the prior art.

It is another object of the invention to provide a rear wheel steering control system operable to correct a rear wheel steering angle according to torque of driven wheels for improving steering stability.

According to one aspect of the present invention, there is provided a rear wheel steering system for a vehicle which comprises a first means for sensing torque of a driven wheel transmitted from an engine to provide a signal indicative thereof, a second means for determining a steered angle of a front wheel to provide a signal indicative thereof, a third means responsive to the signal from the second means to calculate a rear wheel steering angle based on the steered angle of the front wheel, a fourth means responsive to the signal from the first means to determine a correction, for the rear wheel steering angle calculated by the third means, based on the torque of the driven wheel to provide a rear wheel target steering angle and providing a signal indicative thereof, and fifth means responsive to the signal from the fourth means to steer a rear wheel by the rear wheel target steering angle.

In the preferred mode, the system may provide a table for correction defined by a parameter which has a ratio of increase according to variation in a slip ratio of the driven wheel or lateral acceleration acting on a vehicle body, and is proportional to increase in the torque of the driven wheel.

DESCRIPTION OF THE PREFERRED EMBODIMENT

Figure 1:
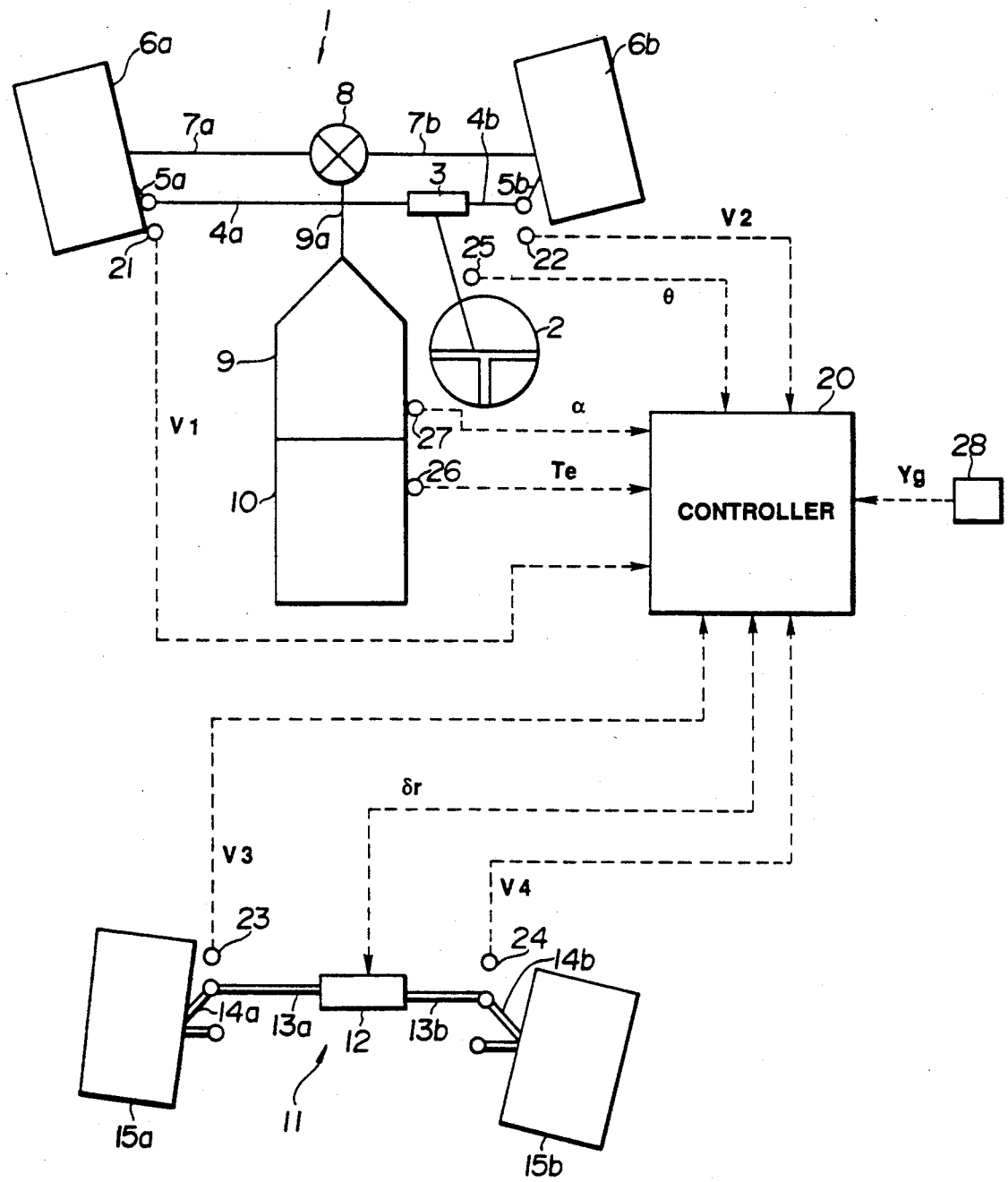
FIG. 1 is a block diagram which shows a steering system according to the present invention incorporated in a front-wheel drive vehicle.

Referring now to the drawings, particularly to FIG. 1, a steering control system according to the present invention is shown which is incorporated in a front-wheel drive (FWD) vehicle. This system includes generally a front wheel steering unit 1, a rear wheel steering unit 11, and a steering controller 20 operable to detect torque of driven wheels and to adjust a rear wheel target steering angle.

The front wheel steering unit 1 includes a steering wheel 2, a rack-and-pinion steering gear 3, relay rods 4a and 4b, and knuckle arms 5a and 5b. The rack-and-pinion steering gear 3 serves to convert rotational motion of the steering wheel 2 into stroke motion to laterally displace the relay rods 4a and 4b for steering front wheels 6a and 6b. Drive shafts 7a and 7b are connected to the front wheels 6a and 6b respectively to transmit drive torque thereto provided from an engine 10. Each drive shaft is connected to an output shaft 9a of a transmission 9 through a differential gear 8.

The rear wheel steering unit 11 includes a hydraulic cylinder 12 such as a spring centered double acting hydraulic pressure cylinder, tie rods 13a and 13b, and rear knuckle arms 14a and 14b coupling intermediate the tie rods and rear wheels 15a and 15b respectively. The hydraulic cylinder 12 is hydraulically communicated with an electromagnetic proportional pressure control valve (not shown) which is connected to a pressure source (not shown). The control valve is responsive to a rear wheel steering angle signal δr output from the steering controller 20 to provide hydraulic pressure to either of the chambers in the hydraulic cylinder 12, displacing the tie rods 13a and 13b to steer rear wheels in a preselected direction.

The steering control system further includes a left front wheel rotational speed sensor 21 for determining speed $v_1$ of the left front wheel, a right front wheel rotational speed sensor 22 for determining speed $v_2$ of the right front wheel, a left rear wheel rotational speed sensor 23 for determining speed $v_3$ of the left rear wheel, a right rear wheel rotational speed sensor 24 for determining speed $v_4$ of the right rear wheel, a steering angle sensor 25 for determining a steered angle $\theta$ of the steering wheel 2, an engine load detection sensor 26 for determining an engine load Te, a torque ratio detection sensor 27 for determining a torque ratio $\alpha$ of input to output shafts of the transmission 9, and an acceleration sensor 28 for determining a lateral acceleration Yg acting on a vehicle body. The engine load detection sensor 26 is adapted for detecting the magnitude of engine load based on a relation between engine speed and an opening of a throttle valve or a relation between an intake air flow and the engine speed. The torque ratio detection sensor 27 is adapted for detecting the input-output torque ratio of the transmission based on a gear ratio (including the final gear ratio) in a case of a manual transmission or gear ratio (including the final gear ratio) and torque ratio of a torque converter in a case of an automatic transmission. Theses sensors provide signals indicative of detected parameters to the steering controller 20, which calculates a rear wheel steering angle and torque of the driven wheels (i.e., the front wheels) based on those signals and then calculate a correction for the rear wheel steering angle corresponding to the calculated driven wheel torque to provide the signal δr indicative of a corrected rear wheel steering angle.

Figure 2:
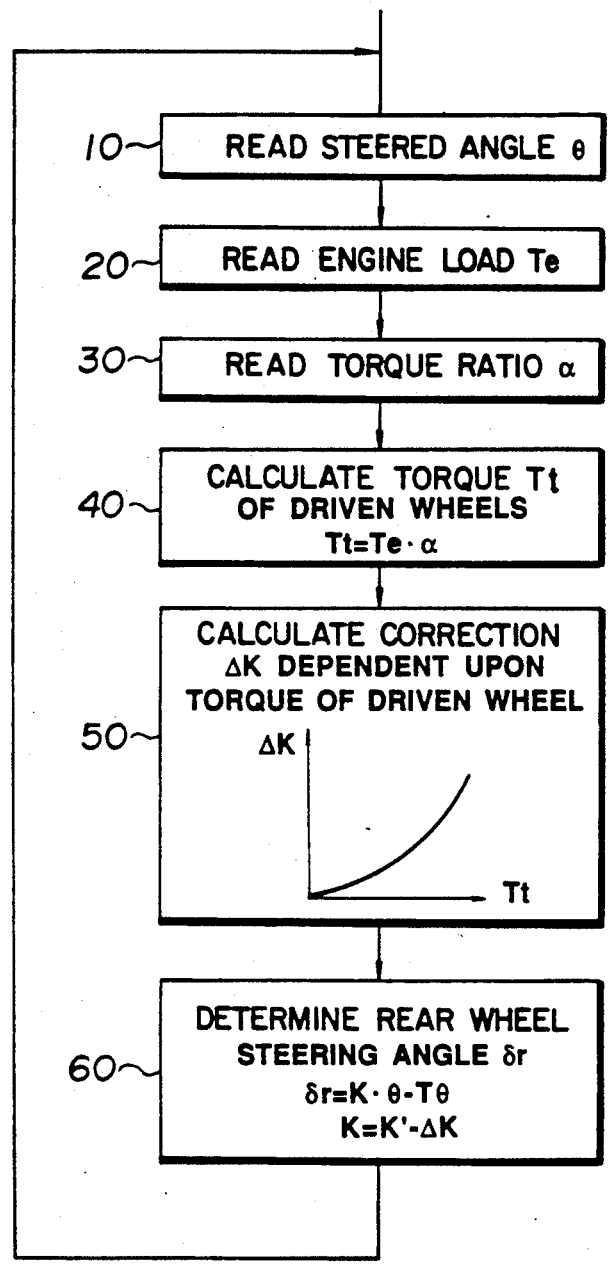
FIG. 2 is a flowchart which shows a sequence of logical steps carried out by a rear wheel steering control system of the invention.

Referring to FIG. 2, a flowchart of a program or sequence of logical steps performed by the steering controller 20 is shown. After entering the program, in steps 10, 20, and 30 the steering controller 20 reads the steered angle $\theta$ from the steered angle sensor 25, the engine load Te from the engine load detection sensor 26, and the torque ratio $\alpha$ from the torque ratio detection sensor 27. Subsequently, the routine proceeds to step 40 wherein the driven wheel torque Tt is determined based on the following equation.

$$Tt = Te \times \alpha \quad (1)$$

The routine then proceeds to step 50 wherein the correction value ΔK corresponding to the driven wheel torque Tt is determined in a manner that a correction curved line preprovided as shown in step 50 in which correction values ΔK for the rear wheel steering angle are plotted is looked up based on the Tt determined by step 40 to obtain a necessary correction value ΔK dependent upon the driven wheel torque Tt. In case of a front-wheel drive vehicle, the correction table may be provided such that the correction value ΔK is low within a range of small driven wheel torque and it increases gradually as the driven wheel torque increases.

Subsequently, the routine proceeds to step 60 wherein a rear wheel target steering angle δr (i.e., a corrected angle) is mathematically calculated according to the following equation including proportional members ($K \times \theta$) and differential members ($T \times \dot{\theta}$).

$$\delta r = K \times \theta - T \times \dot{\theta} \quad (2)$$

where
K: K' − ΔK
K': a coefficient for a reference characteristic of rear wheel steering variable according to vehicle speed
$\theta$: a steered angle of a steering wheel
$\dot{\theta}$: steering angular velocity of a steering wheel
T: a coefficient variable dependent upon the vehicle speed The rear wheel target steering angle δr is obtained by subtracting a value ($T \times \dot{\theta}$) corresponding to the steering angular velocity $\dot{\theta}$ (d$\theta$/dt) from a value given by multiplying the steered angle $\theta$ at that time by the coefficient K. The coefficient K is increased dependent upon increase in the vehicle speed while the coefficient T is decreased dependent upon the increase in the vehicle speed which is defined by measurement based on the type of vehicle.

Figure 3:
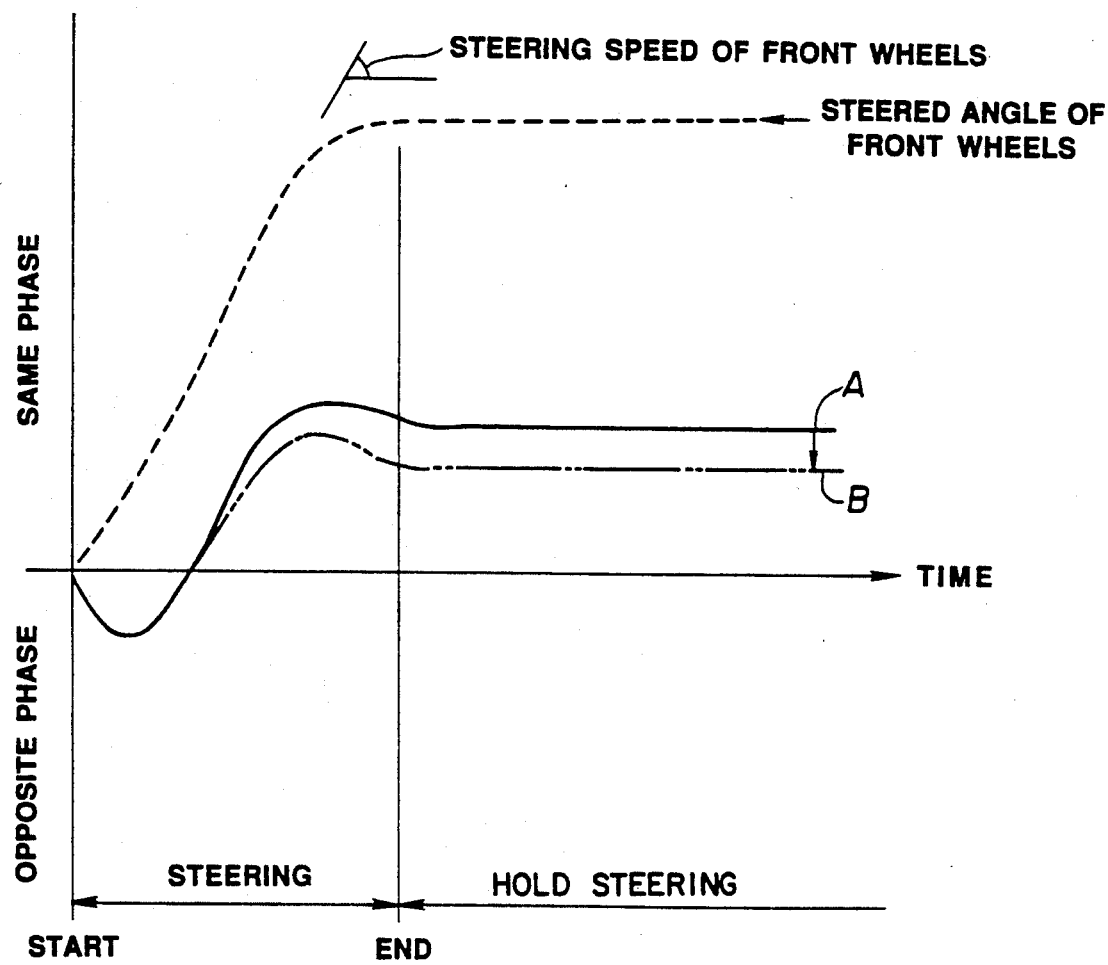
FIG. 3 is a timing chart which shows a rear wheel steering angle determined by a steering control according to the invention.

Referring to FIG. 3, a timing chart of a rear wheel steering angle implemented by the above equation (2) is shown. In the graph, the ordinate axis indicates a steering angle while the axis of abscissa indicates time. Assuming that a steered angle of the front wheels varies as indicated by a broken line, the rear wheels are steered momentarily to a phase opposite a steered angle of the front wheels and then controlled to be steered to the same phase as that of the front wheel. The rear wheel steering angles is controlled to vary to opposite or same phases according to the vehicle speed.

The above equation (2) is applied to a rear wheel steering control system in which a so-called phase inversion control is performed. In the equation (2), the proportional members defines a same phase rear wheel steering angle according to the vehicle speed and the steered angle of the steering wheel to emphasize understeering at intermediate and high speeds, resulting in greatly improved steering stability when turning or during lanes changing and convergence. Also, at low speed understeering is induced slightly to improve turning performance. The differential members provide an opposite phase rear wheel steering angle momentarily at intermediate and high speed according to the angular velocity of the steering wheel or the speed of steering by a driver to advance response to vehicle yawing to obtain high steering response when steering quickly. When steering slowly, no opposite phase angle is provided so that the vehicle responds slowly. The coefficient K is given by the relation of (K' − ΔK). For instance, if the driven wheel torque Tt is great, then the ΔK is great to decrease the K, resulting in a decreased value of ($K \times \theta$). It will be appreciated that the rear wheel steering angle δr can be corrected so as to be decreased from A to B as shown in FIG. 3 to decrease cornering forces of the rear wheels, preventing driftout, caused by suddenly depressing an acceleration pedal, from occurring. When the driven wheel torque Tt is low, the ΔK also becomes low and thus the above correction decreasing the rear wheel steering angle is decreased. Therefore, steering of the same phase can be provided to the rear wheels to prevent tuck-in from occurring.

As mentioned above, since the proportional members ($K \times \theta$) of the equation (2) are compensated according to the driven wheel torque Tt, the rear wheel steering angle is controlled in response to variation in the driven wheel torque when turning as well as vehicle speed or steering of the steering wheel, effectively preventing tuck-in or drift-out from occurring when turning. While in this embodiment the driven wheel torque Tt is obtained by mathematical calculation, it may also, for example, be detected directly by torque pick-ups installed on the driven wheels.

Figure 4:
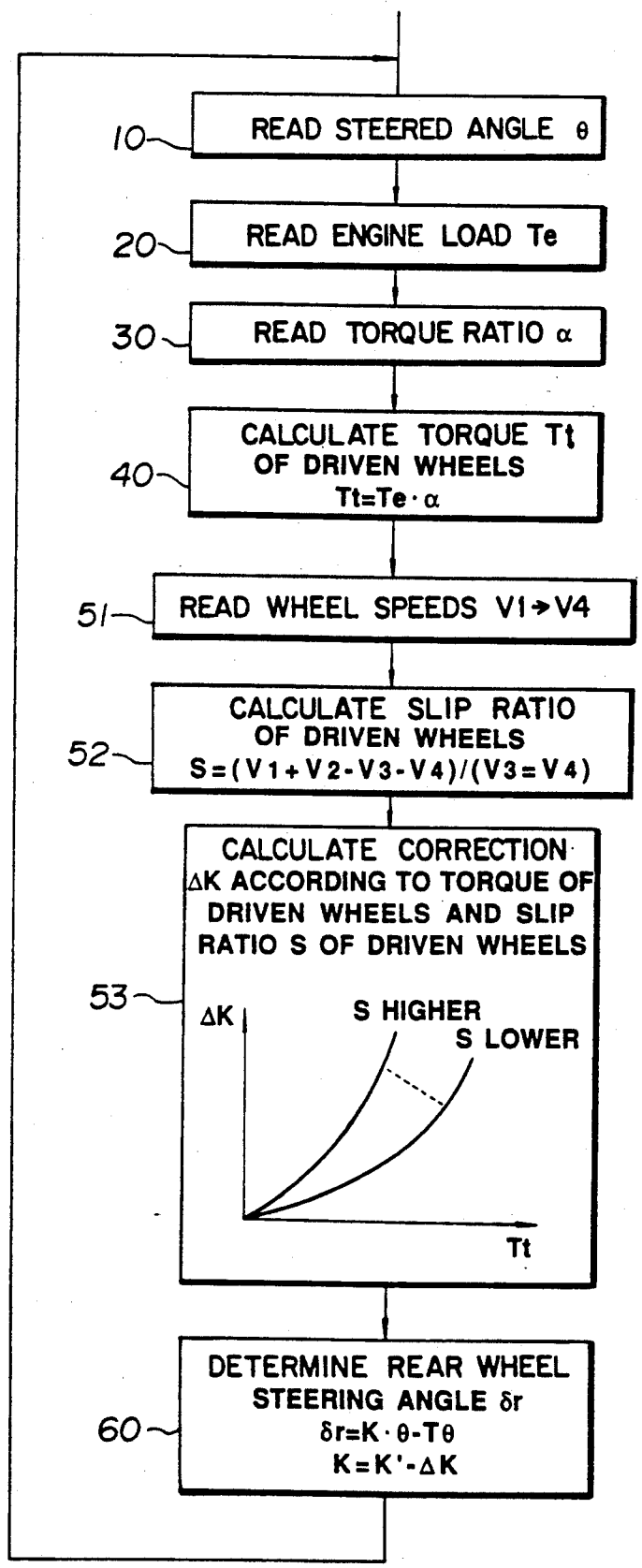
FIGS. 4 and 5 are flowcharts which show alternate programs performed by a rear wheel steering system of the invention.

Referring to FIG. 4, a program flowchart effected by a second embodiment of a rear wheel steering unit is shown. The same steps as those of the first embodiment will be referred by like numbers and will be not described again here.

In this program, after steps 10 to 40, the routine proceeds to step 51 wherein wheel speeds $V_1$ to $V_4$ of the four wheels are picked up. The routine then proceeds to step 52 wherein a slip ratio S of driven wheels is mathematically calculated using the following equation (3) based on the wheel speed $V_1$ to $V_2$.

$$S = (V_1 + V_2 - V_3 - V_4)/(V_3 + V_4) \qquad (3)$$

where
$V_1$: wheel speed of a left front wheel
$V_2$: wheel speed of a right front wheel
$V_3$: wheel speed of a left rear wheel
$V_4$: wheel speed of a right rear wheel Subsequently, in step 53 a correction ΔK is mathematically calculated corresponding the driven wheel torque Tt and the driven wheel slip ratio S. The calculation of the correction ΔK is implemented by selecting one correction curve according to a ratio S from among several correction curves each of which is defined by a coefficient different according to magnitude of the ratio S and then by determining a correction ΔK based on the selected correction curve and the magnitude of the driven wheel torque Tt at that time. By using the resultant correction ΔK, the proportional members ($K \times \theta$) of the above equation (2) is determined.

The second embodiment, as described above, controls the rear wheel steering angle according to the slip ratio of the driven wheels in addition to the driven wheel torque Tt, thus the following advantages are achieved, rolling of the vehicle body during turning decreases weight loads acting on the wheels to cause slip to be generated on the inside driven wheels with the result that cornering forces of the front wheels are reduced to cause the understeering to be increased, however, the correction of the rear wheel steering angle using the driven wheel slip ratio defined by slip of the inside driven wheel prevents understeering from occurring to further improve the steering stability.

Figure 5:
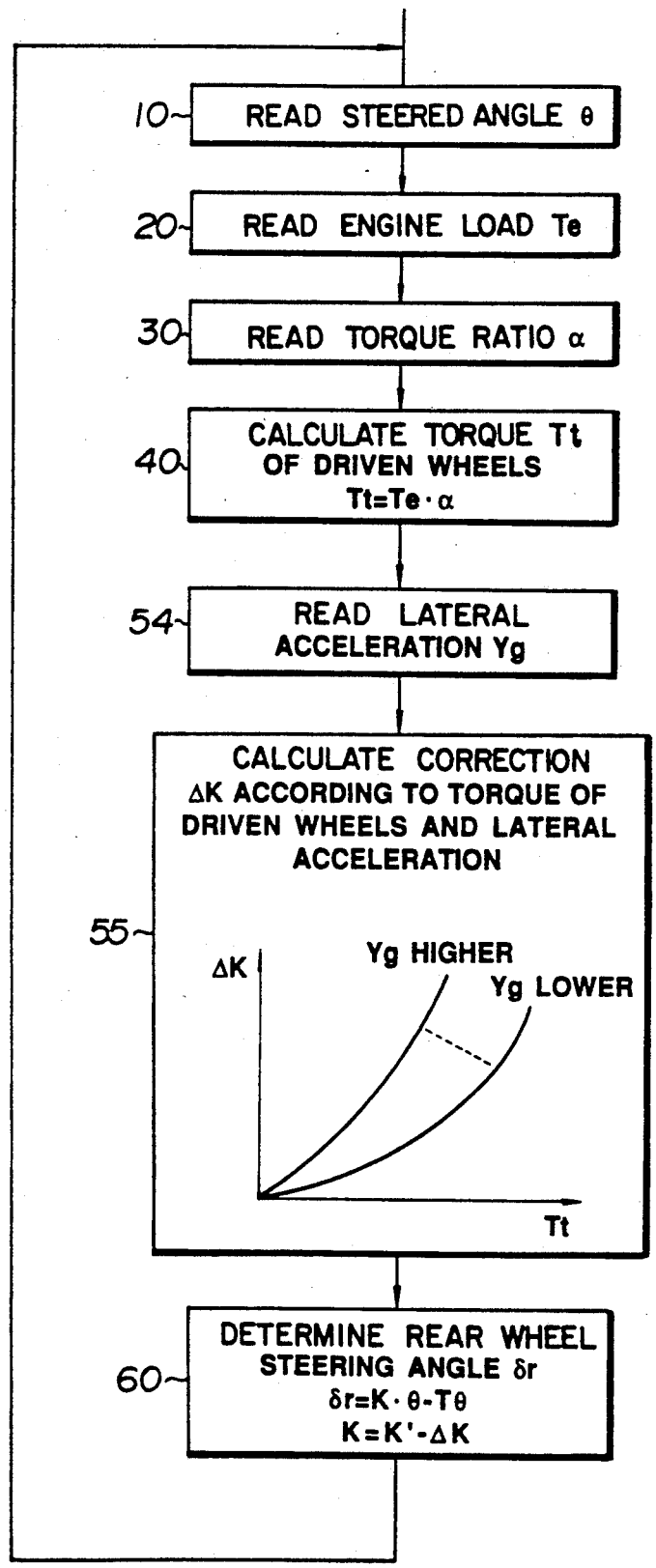

Referring to FIG. 5, a program flowchart effected by a third embodiment of a rear wheel steering unit is shown for obtaining the same effect as that of the second embodiment utilizing lateral acceleration acting on the vehicle body. The same steps as those of the first embodiment will be referred to by like numbers and will be not described again here.

After steps 10 to 40, the routine proceeds to step 54 wherein the lateral acceleration Yg is input from the lateral acceleration sensor 28 to the steering controller 20 because the magnitude of rolling during turning depends upon the lateral acceleration Yg acting on the vehicle body and the rolling is increased as the Yg becomes great. The routine then proceeds to step 55 wherein a correction curve is selected according to a lateral acceleration Yg from among several correction curves which are preprovided based on the magnitude of the lateral acceleration Yg to determine a correction ΔK based on the selected correction curve and a driven wheel torque. By using this correction ΔK to determine the proportional members ($K \times \theta$) of the equation (2), a tendency of understeering due to slipping of the inside driven wheel during turning can be prevented to improve the steering stability. Additionally, because even if driving torque is uniformly transmitted to the driven wheels, when weight loads acting on the driven wheels are small, slip of the driven wheels increases to cause understeering, weight loads acting on the driven wheels may be determined by a sensor such as a suspension stroke sensor or a suspension load sensor, for example, to obtain a correction ΔK based thereon.

While the above embodiments are directed to a front-wheel drive (FWD) vehicle, the present invention may be applicable to a rear-wheel drive (RWD) vehicle. In a case of RWD vehicles, spin tends to occur if an acceleration pedal is suddenly depressed during turning, while releasing the acceleration pedal suddenly causes understeering to be increased in a reverse of the effect in front-wheel drive vehicles. Thus, it is necessary for the rear-wheel drive vehicle to provide correction such that a rear wheel steering angle is increased to the same phase as a steered angle of the front wheels in response to increase in the driven wheel torque Tt, while a rear wheel steering angle is controlled to a phase opposite to a steered angle of the front wheels in response to reduction in the driven wheel torque Tt. In other words, correction characteristics opposite those of front-wheel drive vehicles are necessary for rear-wheel drive vehicles.

As previously mentioned, a feature of the present invention is that a driven wheel torque is detected to correct a rear wheel steering angle based thereon. Therefore, tuck-in (or spin) or drift-out (understeering) is effectively prevented to greatly improve steering stability.

What is claimed is:

1. A rear wheel steering system for a vehicle having front and rear steered wheels and an engine driving a wheel set comprising:
    first means for determining the amount of torque transmitted from the vehicle engine to the driven wheel set and providing a signal indicative thereof;
    second means for determining front wheel steering angle to provide a signal indicative thereof;
    third means responsive to the signal from said second means for calculating rear wheel steering angle based on the steered angle of the front wheel;
    fourth means responsive to the signal from said first means for determining a correction for the rear wheel steering angle calculated by said third means, the correction having an amplitude of a preselected relation to the magnitude of the amount of torque transmitted from the engine to the driven wheel set to provide a rear wheel target steering angle, the fourth means deriving a signal indicative of the rear wheel target steering angle; and fifth means responsive to the amplitude of the signal derived by said fourth means for steering the rear wheel set in accordance with the rear wheel steering angle calculated by said third means and as modified by said correction.

2. A system as set forth in claim 1, wherein said first means includes an engine load detection sensor for detecting an engine load Te to provide a signal indicative thereof and a torque ratio detection sensor for detecting a torque ratio $\alpha$ of input to output of a transmission to provide a signal indicative thereof, said first means determining the torque Tt of the driven wheel set according to a relation of $Tt = Te \times \alpha$.

3. A rear wheel steering system for a vehicle having front and rear steered wheels and an engine driving a wheel set comprising:

first means for sensing torque of the driven wheel set transmitted from the engine to provide a signal indicative thereof;

second means for determining front wheel steering angle to provide a signal indicative thereof;

third means responsive to the signal from said second means for calculating a rear wheel steering angle based on the steered angle of the front wheel;

fourth means responsive to the signal from said first means for determining a correction for the rear wheel steering angle calculated by said third means, the correction being based on the torque of the driven wheel set to provide a rear wheel target steering angle and providing a signal indicative thereof;

fifth means responsive to the signal from said fourth means for steering the rear wheel in accordance with the rear wheel target steering angle; and sixth means for determining wheel speed of a wheel set at one end of the vehicle, the wheel set at said one end of the vehicle being the driven wheel set, the wheel set at the other end of the vehicle being a compliance wheel set, the sixth means deriving a signal indicative of the wheel speed of the driven wheel set and determining a slip ratio S of the driven wheels according to $S = (V_1 + V_2 - V_3 - V_4)/(V_3 + V_4)$, where $V_1$ and $V_2$ are wheel speeds of the driven wheels and $V_3$ and $V_4$ are wheel speed of the compliance wheel, set said fourth means determining the correction $\Delta K$ based on a parameter defined by a preselected function of the magnitude of the slip ratio S, and the value of the torque applied by the engine to the driven wheel set.

4. A system as set forth in claim 3, wherein said second means includes a steering wheel sensor for detecting a steered angle $\theta$ of a steering wheel of the vehicle to provide a signal indicative thereof, said fourth means determining said rear wheel target steering angle $\delta r$ according to:

$$\delta r = K \times \theta - T \times \dot{\theta}$$

where
$K = K' - \Delta K$
$K'$ = a coefficient for a reference characteristic of rear wheel steering angle, the coefficient $K'$ being variable according to vehicle speed
$\theta$ = steering wheel steering angle
$\dot{\theta}$ = rate of change of steering wheel steering angle
$T$ = a coefficient that depends on the vehicle speed.

5. The steering system of claim 3 wherein the value of the correction increases with increases in S and increases in the torque applied by the engine to the driven wheel set.

6. A rear wheel steering system for a vehicle having front and rear steered wheels and an engine driving a wheel set comprising:

first means for sensing torque of the driven wheel set transmitted from the engine to provide a signal indicative thereof;

second means for determining front wheel steering angle to provide a signal indicative thereof;

third means responsive to the signal from said second means for calculating a rear wheel steering angle based on the steering angle of the front wheel;

fourth means responsive to the signal from said first means for determining a correction for the rear wheel steering angle calculated by said third means, the correction being based on the torque of the driven wheel set to provide a rear wheel target steering angle and providing a signal indicative thereof;

fifth means responsive to the signal from said fourth means for steering the rear wheel in accordance with the rear wheel target steering angle; and sixth means for determining lateral acceleration Yg of the vehicle and deriving a signal indicative thereof, said fourth means determining the correction based on a parameter defined by a preselected function of the magnitude of the lateral acceleration Yg, and the value of the torque applied by the engine to the driven wheel set.

7. A system as set forth in claim 6, wherein said second means includes a steering wheel sensor for detecting a steering angle $\theta$ of a steering wheel to provide a signal indicative thereof, said fourth means determining the rear wheel target steering angle $\delta r$ according to:

$$\delta r = K \times \theta - T \times \dot{\theta}$$

where
$K = K' - \Delta K$
$K'$ = a coefficient for a reference characteristic of rear wheel steering that is variable according to vehicle speed
$\theta$ = steering wheel steering angle
$\dot{\theta}$ = rate of change of steering wheel steering angle
$T$ = a coefficient dependent on vehicle speed.

8. The steering system of claim 6 wherein the value of the correction increases with increases in the value of said Yg and increases in the torque applied by the engine to the driven wheel set.

9. The steering system of claim 8 wherein the fourth means store a series of functions relating the correction to the value of said Yg and the torque applied by the engine to the driven wheel set.

10. A rear wheel steering system for a vehicle having front and rear steered wheels and an engine driving a wheel set comprising:

first means for sensing torque transmitted from the engine to the driven wheel set to provide a signal indicative thereof, said first means including an engine load detection sensor for detecting an engine load Te to provide a signal indicative thereof and a torque ratio detection sensor for detecting a torque ratio $\alpha$ of input to output of a transmission to provide a signal indicative thereof, said first means determining the torque Tt of the driven wheel set according to $Tt = Te \times \alpha$;

second means for determining the steering angle of a front wheel to provide a signal indicative thereof, said second means including a steering wheel sensor for detecting a steering wheel steering angle $\theta$ and a signal indicative thereof;

third means responsive to the signal from said second means for calculating rear wheel steering angle based on the steering angle for the front wheel;

fourth means responsive to the signal from said first means for determining a correction for the rear wheel steering angle calculated by said third means, the correction being based on the torque of the driven wheel set to provide a rear wheel target steering angle and providing a signal indicative thereof, said fourth means determining a correction $\Delta K$ factor for the rear wheel steering angle based on a parameter which varies in proportion to increases in the torque of the driven wheel set to provide the rear wheel target steering angle $\delta r$ according to:

$$\delta r = K \times \theta - T \times \dot{\theta}$$

where $K = K' - \Delta K$ $K'$ = a coefficient for a reference characteristic of rear wheel steering that is variable according to vehicle speed $\theta$ = steering wheel steering angle $\dot{\theta}$ = rate of change of steering wheel steering angle $T$ = a coefficient depending upon the vehicle speed; and fifth means responsive to the signal from said fourth means for steering a rear wheel in accordance with the rear wheel target steering angle.

11. A method of controlling the steering angle of rear wheels of an automotive vehicle having a front wheel steering angle controlled by turning of a steering wheel, the vehicle including a motor for driving driven wheels of the vehicle, the method comprising sensing the amplitude of torque transmitted from the motor to the driven wheels, sensing the amplitude of the steering angle for the front wheels, and controlling the steered angle of the rear wheels in response to the sensed amplitude of the torque transmitted from the motor to the driven wheels and the amplitude of the steered angle for the front wheels.

12. The method of claim 11 wherein the motor drives only the wheels at one end of the vehicle.

13. An automotive vehicle comprising a front set of steerable wheels, a rear set of steerable wheels, motor means for rotatably driving only one set of said sets of wheels, steering wheel means for turning the front set of wheels to a controlled steered angle, means for detecting the amplitude of torque transmitted from the motor means to said one set of wheels, means for detecting the steering angle of the front set of wheels, and means responsive to both said detecting means for controlling steering angle of the rear set of wheels as a function of the amplitudes of the detected torque and the detected steering angle for the front set of wheels.

14. The vehicle of claim 1, wherein the set of wheels is the front set of wheels.

15. The vehicle of claim 13 wherein the one set of wheels is the rear set of wheels.

* * * * *